United States Patent
Panikkar et al.

(10) Patent No.: US 12,039,475 B2
(45) Date of Patent: Jul. 16, 2024

(54) INFRASTRUCTURE RESOURCE CAPACITY MANAGEMENT WITH INTELLIGENT EXPANSION TRIGGER COMPUTATION

(71) Applicant: Dell Products L.P., Round Rock, TX (US)

(72) Inventors: Shibi Panikkar, Bangalore (IN); Sisir Samanta, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/375,300

(22) Filed: Jul. 14, 2021

(65) Prior Publication Data
US 2022/0398520 A1 Dec. 15, 2022

(30) Foreign Application Priority Data

Jun. 11, 2021 (IN) .............................. 202141026123

(51) Int. Cl.
*G06Q 10/0631* (2023.01)
*G06F 9/50* (2006.01)
*G06Q 30/0201* (2023.01)
*H04L 67/10* (2022.01)

(52) U.S. Cl.
CPC ....... *G06Q 10/06315* (2013.01); *G06F 9/505* (2013.01); *G06F 9/5072* (2013.01); *G06Q 30/0201* (2013.01); *H04L 67/10* (2013.01)

(58) Field of Classification Search
CPC ...... G06F 9/45558; G06F 9/5083; G06F 8/60; G06F 9/5072; H04L 67/10; H04W 16/04
See application file for complete search history.

(56) References Cited

U.S. PATENT DOCUMENTS

| | | | | |
|---|---|---|---|---|
| 2002/0174306 A1* | 11/2002 | Gajjar | ................. | G06F 12/1458 |
| | | | | 711/148 |
| 2012/0096165 A1* | 4/2012 | Madduri | ............... | G06F 9/5083 |
| | | | | 709/226 |
| 2012/0198073 A1* | 8/2012 | Srikanth | ................. | H04L 67/10 |
| | | | | 709/226 |
| 2017/0206481 A1* | 7/2017 | Cheeran | ................ | G06F 3/0482 |
| 2017/0359752 A1* | 12/2017 | Yousefi'zadeh | ........................... | |
| | | | | H04W 36/00837 |
| 2018/0046477 A1* | 2/2018 | Aelken | ................. | G06F 9/5072 |

(Continued)

OTHER PUBLICATIONS

A. Federgruen et al., "Selecting a Portfolio of Suppliers Under Demand and Supply Risks," Operations 2008, pp. 916-936.

(Continued)

*Primary Examiner* — Mahran Y Abu Roumi
(74) *Attorney, Agent, or Firm* — Ryan, Mason & Lewis, LLP

(57) ABSTRACT

Infrastructure resource capacity management techniques in an information processing system are disclosed. For example, a method comprises the following steps. Data associated with at least one resource of one or more computing platforms is obtained. Each of the one or more computing platforms is deployed at one or more locations associated with one or more entities. One or more resource expansion trigger threshold values are computed based on at least a portion of the obtained data for each of the one or more computing platforms. A resource expansion operation is initiated for the one or more computing platforms based on the one or more resource expansion trigger threshold values.

20 Claims, 14 Drawing Sheets

(56) References Cited

U.S. PATENT DOCUMENTS

2018/0267833 A1* 9/2018 Chen ................... G06F 9/45558
2020/0257568 A1* 8/2020 Watanabe ............... H04M 3/00
2022/0269902 A1* 8/2022 Roberts .................... G06N 3/04

OTHER PUBLICATIONS

B. Stecanella, "An Introduction to Support Vector Machines (SVM)" https://monkeylearn.com/blog/introduction-to-support-vector-machines-svm/#:~:text=A%20support%20vector%20machine%20(SVM,able%20to%20categorize%20new%20text, Jun. 22, 2017, 20 pages.
Wikipedia, "Support-vector Machine," https://en.wikipedia.org/wiki/Support-vector_machine, Apr. 18, 2021, 20 pages.
Wikipedia, "Linear Regression," https://en.wikipedia.org/wiki/Linear_regression, Apr. 15, 2021, 17 pages.
Bayes Server, "Prediction with Bayesian Networks," https://www.bayesserver.com/docs/techniques/prediction#:~:text=Joint%20prediction,are%20in%20the%20same%20model, Accessed Apr. 19, 2021, 10 pages.
Wikipedia, "Machine Learning," https://en.wikipedia.org/wiki/Machine_learning, Jul. 5, 2021, 26 pages.
Dell Technologies, "APEX," APEX Brochure, Jul. 2020, 7 pages.
S. Sinclair et al., "Dell Technologies APEX," ESG White Paper, Apr. 2021, 9 pages.
U.S. Appl. No. 17/237,204 filed in the name of Shibi Panikkar et al. on Apr. 22, 2021, and entitled "Artificial Intelligence-Based Attach Rate Planning for Computer-Based Supply Planning Management System.".

* cited by examiner

| WEEK (Bi-WEEKLY) | AVG USAGE (TB) | COMMITMENT (TB) | BUFFER (TB) | REQUIRED CAPACITY (TB) | INSTALLED CAPACITY (TB) | USAGE % |
|---|---|---|---|---|---|---|
| W1-2 | 60.00 | 100.00 | 25.00 | 125.00 | 125.00 | 48.00 |
| W3-4 | 70.00 | 100.00 | 25.00 | 125.00 | 125.00 | 56.00 |
| W5-6 | 95.00 | 100.00 | 25.00 | 125.00 | 125.00 | 76.00 |
| W7-8 | 100.00 | 100.00 | 25.00 | 125.00 | 125.00 | |
| W9-10 | 110.00 | 100.00 | 25.00 | 135.00 | 150.00 | 73.33 |
| W11-12 | 120.00 | 100.00 | 25.00 | 145.00 | 150.00 | |
| W13-14 | 125.00 | 100.00 | 25.00 | 150.00 | 250.00 | 50.00 |
| W15-16 | 130.00 | 100.00 | 25.00 | 155.00 | 250.00 | 52.00 |
| W17-18 | 135.00 | 100.00 | 25.00 | 160.00 | 250.00 | 54.00 |
| W19-20 | 138.00 | 100.00 | 25.00 | 163.00 | 250.00 | 55.20 |
| W21-22 | 140.00 | 100.00 | 25.00 | 165.00 | 250.00 | 56.00 |
| W23-24 | 145.00 | 100.00 | 25.00 | 170.00 | 250.00 | 58.00 |
| W25-26 | 190.00 | 150.00 | 37.50 | 227.50 | 250.00 | 76.00 |
| W27-28 | 210.00 | 150.00 | 37.50 | 247.50 | 250.00 | |
| W29-30 | 250.00 | 150.00 | 37.50 | 287.50 | 350.00 | 71.43 |
| W31-32 | 270.00 | 150.00 | 37.50 | 307.50 | 350.00 | 77.14 |
| W33-34 | 275.00 | 150.00 | 37.50 | 312.50 | 350.00 | 78.57 |
| W35-36 | 278.00 | 150.00 | 37.50 | 315.50 | 350.00 | 79.43 |
| W37-38 | 280.00 | 250.00 | 62.50 | 342.50 | 350.00 | |
| W39-40 | 290.00 | 250.00 | 62.50 | 352.50 | 450.00 | 64.44 |
| W41-42 | 295.00 | 250.00 | 62.50 | 357.50 | 450.00 | 65.56 |
| W43-44 | 305.00 | 250.00 | 62.50 | 367.50 | 450.00 | 67.78 |
| W45-46 | 315.00 | 250.00 | 62.50 | 377.50 | 450.00 | 70.00 |
| W47-48 | 380.00 | 250.00 | 62.50 | 442.50 | 450.00 | |
| W49-50 | 420.00 | 250.00 | 62.50 | 482.50 | 550.00 | 76.36 |
| W51-52 | 450.00 | 250.00 | 62.50 | 512.50 | 600.00 | 75.00 |

*FIG. 5* 500

| WEEK (Bi-WEEKLY) | INSTALL BASE A - SLOW GROWTH ||||  INSTALL BASE B - RAPID GROWTH ||||
|---|---|---|---|---|---|---|---|---|
| | AVG USAGE (TB) | COMMITMENT (TB) | INSTALLED CAPACITY (TB) | USAGE % | AVG USAGE (TB) | COMMITMENT (TB) | INSTALLED CAPACITY (TB) | USAGE % |
| W1-2 | 60.00 | 100.00 | 125.00 | 48.00 | 350.00 | 400.00 | 500.00 | 70.00 |
| W3-4 | 70.00 | 100.00 | 125.00 | 56.00 | 370.00 | 400.00 | 500.00 | 74.00 |
| W5-6 | 75.00 | 100.00 | 125.00 | 60.00 | 390.00 | 400.00 | 500.00 | 78.00 |
| W7-8 | 80.00 | 100.00 | 125.00 | 64.00 | 410.00 | 400.00 | 500.00 | ░░░░ |
| W9-10 | 95.00 | 100.00 | 125.00 | 76.00 | 430.00 | 400.00 | 550.00 | 78.18 |
| W11-12 | 110.00 | 100.00 | 125.00 | ░░░░ | 450.00 | 400.00 | 550.00 | ░░░░ |
| W13-14 | 115.00 | 100.00 | 180.00 | 63.89 | 470.00 | 400.00 | 600.00 | 78.33 |
| W15-16 | 125.00 | 100.00 | 180.00 | 69.44 | 490.00 | 400.00 | 600.00 | ░░░░ |
| W17-18 | 135.00 | 100.00 | 180.00 | 75.00 | 510.00 | 400.00 | 650.00 | 78.46 |
| W19-20 | 138.00 | 100.00 | 180.00 | 76.67 | 530.00 | 400.00 | 650.00 | ░░░░ |
| W21-22 | 140.00 | 100.00 | 180.00 | 77.78 | 550.00 | 400.00 | 700.00 | 78.57 |
| W23-24 | 145.00 | 100.00 | 180.00 | ░░░░ | 570.00 | 500.00 | 700.00 | ░░░░ |
| W25-26 | 150.00 | 100.00 | 230.00 | 65.22 | 590.00 | 500.00 | 750.00 | 78.67 |
| W27-28 | 170.00 | 100.00 | 230.00 | 73.91 | 610.00 | 500.00 | 750.00 | ░░░░ |
| W29-30 | 175.00 | 100.00 | 230.00 | 76.09 | 630.00 | 500.00 | 800.00 | 78.75 |
| W31-32 | 180.00 | 100.00 | 230.00 | 78.26 | 650.00 | 600.00 | 800.00 | ░░░░ |
| W33-34 | 190.00 | 100.00 | 230.00 | ░░░░ | 670.00 | 600.00 | 850.00 | 78.82 |
| W35-36 | 200.33 | 150.00 | 280.00 | 71.55 | 690.00 | 600.00 | 850.00 | ░░░░ |
| W37-38 | 209.48 | 150.00 | 280.00 | 74.81 | 710.00 | 600.00 | 900.00 | 78.89 |
| W39-40 | 218.62 | 150.00 | 280.00 | 78.08 | 730.00 | 600.00 | 900.00 | ░░░░ |
| W41-42 | 227.76 | 150.00 | 280.00 | ░░░░ | 750.00 | 700.00 | 950.00 | 78.95 |
| W43-44 | 236.90 | 200.00 | 330.00 | 71.79 | 770.00 | 700.00 | 950.00 | ░░░░ |
| W45-46 | 246.05 | 200.00 | 330.00 | 74.56 | 790.00 | 700.00 | 1000.00 | 79.00 |
| W47-48 | 255.19 | 200.00 | 330.00 | 77.33 | 810.00 | 700.00 | 1000.00 | ░░░░ |
| W49-50 | 264.33 | 200.00 | 330.00 | ░░░░ | 830.00 | 700.00 | 1050.00 | 79.05 |
| W51-52 | 273.48 | 200.00 | 380.00 | 71.97 | 850.00 | 800.00 | 1050.00 | ░░░░ |

FIG. 7

| WEEK (Bi-WEEKLY) | AVG USAGE (TB) | COMMITMENT (TB) | BUFFER (TB) | INSTALLED CAPACITY (TB) | GROWTH RATE NEXT 15 DAYS | GROWTH RATE NEXT 30 DAYS | GROWTH RATE NEXT 3 MONTHS |
|---|---|---|---|---|---|---|---|
| W1-2 | 180.00 | 100.00 | 45.00 | 250.00 | - | - | - |
| W3-4 | 120.00 | 100.00 | 30.00 | 250.00 | 1.50 | 3.02 | 9.85 |
| W5-6 | 121.80 | 100.00 | 30.45 | 250.00 | 1.50 | 3.02 | 9.85 |
| W7-8 | 123.63 | 100.00 | 30.91 | 250.00 | 1.50 | 5.05 | 9.85 |
| W9-10 | 125.48 | 100.00 | 31.37 | 250.00 | 3.50 | 5.05 | 9.85 |
| W11-12 | 129.87 | 100.00 | 32.47 | 250.00 | 1.50 | 3.02 | 9.28 |
| W13-14 | 131.82 | 120.00 | 32.96 | 250.00 | 1.50 | 3.02 | 7.73 |
| W15-16 | 133.80 | 120.00 | 33.45 | 250.00 | 1.50 | 3.02 | 7.73 |
| W17-18 | 135.81 | 120.00 | 33.95 | 250.00 | 1.50 | 4.51 | 98.81 |
| W19-20 | 137.84 | 120.00 | 34.46 | 250.00 | 2.96 | 3.02 | 125.26 |
| W21-22 | 139.91 | 150.00 | 37.50 | 250.00 | 0.06 | 1.56 | 91.00 |
| W23-24 | 142.01 | 150.00 | 35.50 | 250.00 | 1.50 | 90.13 | 119.52 |
| W25-26 | 144.14 | 150.00 | 36.03 | 250.00 | 87.32 | 115.42 | 88.82 |
| W27-28 | 250.00 | 150.00 | 87.50 | | 15.00 | 0.40 | 15.92 |
| W29-30 | 287.50 | 250.00 | 100.63 | 400.00 | 12.70 | 0.40 | 12.00 |
| W31-32 | 251.00 | 250.00 | 87.85 | 400.00 | 15.00 | 0.40 | 15.92 |
| W33-34 | 288.65 | 250.00 | 101.03 | 400.00 | 12.70 | 0.40 | 18.52 |
| W35-36 | 252.00 | 250.00 | 88.20 | 400.00 | 15.00 | 0.40 | 4.96 |
| W37-38 | 289.80 | 250.00 | 101.43 | 400.00 | 12.70 | 0.40 | 12.01 |
| W39-40 | 253.00 | 250.00 | 88.55 | 400.00 | 15.00 | 7.04 | 36.07 |
| W41-42 | 290.95 | 250.00 | 101.83 | 400.00 | 19.17 | 9.09 | 59.73 |
| W43-44 | 230.00 | 250.00 | 87.50 | 400.00 | 12.46 | 8.43 | 0.00 |
| W45-46 | 264.50 | 250.00 | 92.58 | 400.00 | 3.59 | 30.15 | 0.00 |
| W47-48 | 255.00 | 250.00 | 89.25 | 400.00 | 35.00 | 82.25 | 0.00 |
| W49-50 | 344.25 | 250.00 | 120.49 | | 35.00 | 0.00 | 0.00 |
| W51-52 | 464.74 | 300.00 | 162.66 | 600.00 | 0.00 | 0.00 | 0.00 |

FIG. 13A

| CUSTOMER | PRODUCT | PREDICTED CONSUMPTION RATE | CURRENT BALANCE CAPACITY | PREDICTED RUNOUT DATE |
|---|---|---|---|---|
| CUSTOMER 1 (INSTALL BASE 1) | PowerScale™ | 250 TB/DAY | 250K TB | SYSDate + (CBC/PCR) = 12/10/2021 |
| CUSTOMER 1 (INSTALL BASE 2) | PowerStore™ | 127 TB/DAY | 129K TB | SYSDate + (CBC/PCR) = 10/12/2021 |
| CUSTOMER 2 (INSTALL BASE 1) | PowerScale™ | 83 TB/DAY | 190K TB | SYSDate + (CBC/PCR) = 12/2/2022 |
| CUSTOMER 2 (INSTALL BASE 2) | PowerStore™ | 12 TB/DAY | 233K TB | SYSDate + (CBC/PCR) = 10/9/2022 |

| CUSTOMER | PRODUCT | PREDICTED CONSUMPTION RATE | CURRENT BALANCE CAPACITY | PREDICTED ORDER PLACING DATE |
|---|---|---|---|---|
| CUSTOMER 1 (INSTALL BASE 1) | PowerScale™ | 250 TB/DAY | 250K TB | 09/09/2021 |
| CUSTOMER 1 (INSTALL BASE 2) | PowerStore™ | 127 TB/DAY | 129K TB | 07/07/2021 |
| CUSTOMER 2 (INSTALL BASE 1) | PowerScale™ | 83 TB/DAY | 190K TB | 08/02/2022 |
| CUSTOMER 2 (INSTALL BASE 2) | PowerStore™ | 12 TB/DAY | 233K TB | 03/04/2022 |

| CUSTOMER | PREDICTED ORDER PLACING DATE | SysDATE | PREDICTED CONSUMPTION RATE (TB) | BALANCE CAPACITY | THRESHOLD |
|---|---|---|---|---|---|
| CUSTOMER 1 (INSTALL BASE 1) | 9/9/2021 | 1/15/2021 | 250 | 250000 | 72% |
| CUSTOMER 1 (INSTALL BASE 2) | 7/7/2021 | 1/15/2021 | 127 | 129000 | 68% |
| CUSTOMER 2 (INSTALL BASE 1) | 8/2/2022 | 1/15/2021 | 83 | 190000 | 87% |
| CUSTOMER 2 (INSTALL BASE 2) | 44624 | 1/15/2021 | 12 | 233000 | 82% |

1330

INFRASTRUCTURE RESOURCE CAPACITY MANAGEMENT WITH INTELLIGENT EXPANSION TRIGGER COMPUTATION

FIELD

The field relates generally to information processing systems, and more particularly to resource capacity management in information processing systems.

BACKGROUND

For more than a decade now, cloud service deployment has continued to grow and almost every industry utilizes some form of a cloud service to provide a better experience for its customers. However, while utilization of cloud services has expanded, one issue that typically causes hesitation for an enterprise is the utilization of a public cloud platform for all of its customer services. A public cloud platform is understood to include public cloud infrastructure such as, but not limited to, Amazon Web Services (AWS), Google Cloud Platform (GCP), Microsoft Azure, etc., wherein a public cloud provider (e.g., Amazon, Google, Microsoft) manages services for multiple enterprises (tenants) on the same computing and storage infrastructure. As such, some enterprises prefer to have a private cloud platform (e.g., not shared by multiple tenants) or on-premises cloud platform (e.g., located at the enterprise location or otherwise at a location under the control of the enterprise) wherein the enterprise has access to the cloud platform for its exclusive use. Many enterprises take a hybrid approach and utilize a combination of a public cloud platform and a private cloud platform to provide its stakeholders and/or other entities (e.g. employees, third parties, etc.) with services.

SUMMARY

Illustrative embodiments provide infrastructure resource capacity management techniques in an information processing system.

For example, in an illustrative embodiment, a method comprises the following steps. Data associated with at least one resource of one or more computing platforms is obtained. Each of the one or more computing platforms is deployed at one or more locations associated with one or more entities. One or more resource expansion trigger threshold values are computed based on at least a portion of the obtained data for each of the one or more computing platforms. A resource expansion operation is initiated for the one or more computing platforms based on the one or more resource expansion trigger threshold values.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments compute a resource expansion trigger threshold value unique to each of the one or more entities such that the resource expansion operation is customized to each of the one or more entities. A unit multiplication factor value and runout time value can also be computed for each entity in addition to the resource expansion trigger threshold value using one or more machine learning algorithms. Furthermore, the one or more entities may comprise one or more customers of an infrastructure provider that provides the one or more computing platforms.

These and other illustrative embodiments include, without limitation, apparatus, systems, methods and computer program products comprising processor-readable storage media.

BRIEF DESCRIPTION OF THE DRAWINGS

FIG. 3 illustrates a tabular representation of exemplary data with which an infrastructure resource capacity management process can be implemented according to an illustrative embodiment.

FIG. 5 illustrates a tabular representation of exemplary data with which an infrastructure resource capacity management process can be implemented according to an illustrative embodiment.

FIG. 7 illustrates a tabular representation of exemplary data with which an infrastructure resource capacity management process can be implemented according to an illustrative embodiment.

FIGS. 13A-13C illustrate exemplary data associated with multiple customers using infrastructure resource capacity management according to an illustrative embodiment.

DETAILED DESCRIPTION

Figure 1:
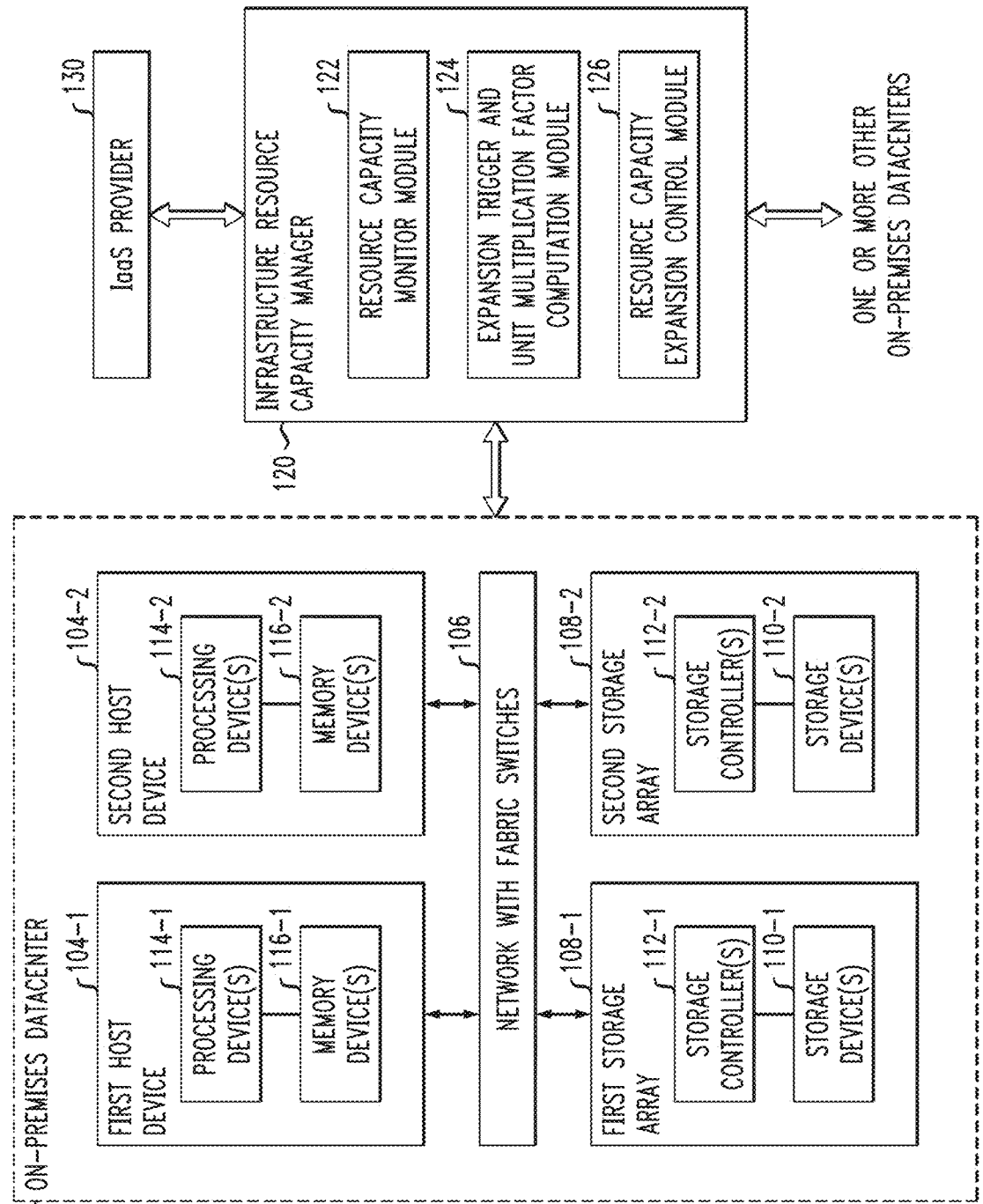
FIG. 1 depicts an information processing system with infrastructure resource capacity management according to an illustrative embodiment.

As mentioned above in the background section, many enterprises utilize at least some form of a private (or on-premises) cloud platform to provide its customers with services. Private clouds, however, require a dedicated cluster/datacenter at the customer site (i.e., on-premises and also referred to as client side), which can be provided by an Infrastructure-as-a-Service (IaaS) provider. For example, the IaaS provider deploys infrastructure resources at the customer site including, for example, computing, network and/or storage resources. The customer is typically charged on a capacity-usage basis (e.g., terabytes of storage per month, etc.). However, the IaaS approach increases infrastructure cost for the customer and also increases effort and cost associated with continuous expansion of additional infrastructure resources to maintain a satisfactory cloud experience. Thus, a major challenge for the IaaS provider is to keep costs competitive without compromising cloud experience for the customer.

An IaaS provider cannot deliver an on-premises cloud platform with unlimited resource capacity to a customer so it needs to provide additional capacity periodically before the current resource capacity of the customer is exceeded (e.g., before the current platform configuration runs out of available storage space). Thus, to effectively provide an unlimited storage space cloud experience in a hybrid/private cloud platform environment, IaaS providers monitor infrastructure usage. Whenever a specific resource usage threshold is crossed (e.g., 80% threshold is exceeded) an additional order is initiated, manufactured, shipped and deployed at the customer site. While this process helps to keep up the customer experience of unlimited resource capacity by deploying the additional resources, the process raises at least two important questions: (i) when does the expansion need to be triggered; and (ii) how much additional capacity needs to ship to a specific customer.

It is realized herein that the rate and pattern of resource capacity consumption are different for different customers. As such, it is further realized herein that it is not advisable to statically maintain the trigger threshold value of consumption to 80% (or whatever fixed percentage is typically set) nor is it advisable to maintain the same trigger threshold value to apply to all customers. If an IaaS provider follows a static threshold, it will end up shipping expansion hardware too early (e.g., customers whose rate of consumption is relatively less) or shipping expansion hardware too late (e.g., customers whose rate of consumption is relatively high), wherein the former group of customers may end up with more capacity then they need while the latter group of customers may run out of capacity. Furthermore, besides rate of consumption, it is realized herein that IaaS providers need to investigate other factors such as customer deployment time, addition of new features or applications, customer uptime, etc.

Similarly, if the IaaS provider is shipping only one additional device (resource) at the time of expansion, it will end up shipping very frequently for high-consuming customers. One solution is to ship multiple additional devices to avoid frequent shipment. However, such an approach cannot be generalized for all customers as their behaviors are different. If large numbers of extra devices are shipped, this would be an unnecessary cost to low consumption rate customers. Still further, it is realized that manually deriving the additional amount of capacity for customers is too complicated and error prone without the proper data statistics, which are not readily available today.

Illustrative embodiments address the above and other shortcomings of the static threshold-based approach by intelligently and efficiently deriving the most accurate threshold (e.g., in percentage) for each customer, and then calculating the order triggering date required. Illustrative embodiments also find the optimal number of additional devices needed for that customer. The date then can be fed to an optimized resource delivery module for the customer location without compromising cloud experience.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds each with multiple cloud resources. Resources can include, but are not limited to, hardware (e.g., storage devices, processing devices, memory devices, routers, switches, etc.), software (e.g., existing software upgrades, new software products, etc.), and/or combinations thereof. Different types of enterprise computing and storage systems are also encompassed by the term "information processing system" as that term is broadly used herein.

FIG. 1 shows an information processing system 100 configured in accordance with an illustrative embodiment. The information processing system 100 comprises an on-premises datacenter 102 and an infrastructure resource capacity manager 120 coupled to an IaaS provider 130. Thus, in one or more illustrative embodiments, the on-premise datacenter 102 comprises a set of computing, network, and storage resources of which at least a subset of the resources are IaaS resources provided by IaaS provider 130 and automatically managed by the infrastructure resource capacity manager 120.

The on-premises datacenter 102 comprises at least first and second host devices 104-1 and 104-2, referred to herein collectively as host devices 104 and individually as host device 104. Host device 104-1 comprises one or more processing devices 114-1 and one or more memory devices 116-1, while host device 104-2 comprises one or more processing devices 114-2 and one or more memory devices 116-2. Processing devices 114-1 and 114-2 are referred to herein collectively as processing devices 114 and individually as processing device 114, while memory devices 116-1 and 116-2 are referred to herein collectively as memory devices 116 and individually as memory device 116.

The host devices 104 are coupled to a network 106 that comprises one or more fabric switches. The host devices 104 communicate over the network 106 via the one or more fabric switches with at least first and second storage arrays 108-1 and 108-2, referred to herein collectively as storage arrays 108 and individually as storage array 108. Storage array 108-1 comprises one or more storage devices 110-1 and one or more storage controllers 112-1, while storage array 108-2 comprises one or more storage devices 110-2 and one or more storage controllers 112-2. Storage devices 110-1 and 110-2 are referred to herein collectively as storage devices 110 and individually as storage device 110, while storage controllers 112-1 and 112-2 are referred to herein collectively as storage controllers 112 and individually as storage controller 112.

For example, the network 106 illustratively comprises at least one storage area network (SAN) and the one or more fabrics switches illustratively comprise respective distinct fabric switches of a set of multiple fabric switches interconnecting the host devices 104 with the storage arrays 108 over the one or more SANs. Each of the one or more fabric switches in some embodiments is associated with a different SAN. By way of example only, the system 100 may be configured such that the first host device 104-1 communicates with the first storage array 108-1 over a first fabric switch and communicates with the second storage array 104-2 over a second fabric switch. Similarly, the second host device 104-2 can communicate with the first storage array 108-1 over the first fabric switch and communicate with the second storage array 108-2 over the second fabric switch. Numerous other interconnection arrangements are possible. Note also that, in various embodiments, the network 106 can comprise one or more fabrics, each fabric having one or more switches. Also, other types of networks can be used in other embodiments, and references to SANs, switches, fabrics or other particular network arrangements herein are for purposes of illustration only, as non-limiting examples.

Although only two host devices 104 and two storage arrays 108 are shown in the figure, this is by way of illustrative example only, and other embodiments can include additional instances of such elements. It is also possible that alternative embodiments may include only a single host device.

Furthermore, at least a subset of the host devices 104 may be implemented as respective virtual machines of a compute services platform or other type of processing platform. The host devices 104 in such an arrangement illustratively provide compute services such as execution of one or more applications on behalf of each of one or more users associated with respective ones of the host devices 104. The term "user" herein is intended to be broadly construed so as to encompass numerous arrangements of human, hardware, software or firmware entities, as well as combinations of such entities. Compute and/or storage services may be provided for one or more users under an IaaS model, although it is to be appreciated that numerous other cloud infrastructure arrangements could be used, e.g., a Platform-as-a-Service (PaaS) model and/or a Function-as-a-Service (FaaS) model.

The network 106 may be implemented using multiple networks of different types to interconnect the various components of the information processing system 100. For example, the network 106 may comprise a portion of a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks. The network 106 in some embodiments therefore comprises combinations of multiple different types of networks each comprising processing devices configured to communicate using Internet Protocol (IP) and/or other types of communication protocols. As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel (FC). Numerous alternative networking arrangements are possible in a given embodiment, as will be appreciated by those skilled in the art. Although illustratively shown as separate from the network 106 in the figure, at least portions of the storage arrays 108 may be considered part of the network 106 in some embodiments. For example, in embodiments in which the network 106 comprises at least one SAN, the storage arrays 108 may be viewed as part of the one or more SANs.

The storage devices 110 of the storage arrays 108 illustratively comprise solid state drives (SSDs). Such SSDs in some embodiments are implemented using non-volatile memory (NVM) devices such as flash memory. Other types of NVM devices that can be used to implement at least a portion of the storage devices 110 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 108 illustratively comprises one or more VNX®, VMAX®, Unity™, PowerMax™, PowerStore™ and PowerScale™ storage arrays, as well as other commercially available storage arrays from Dell Technologies Inc. of Hopkinton, Massachusetts.

As another example, one or both of the storage arrays 108 may comprise respective clustered storage systems, each including a plurality of storage nodes interconnected by one or more networks. An example of a clustered storage system of this type is an XtremIO™ storage array from Dell Technologies Inc. illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 104 and the storage arrays 108 within the system 100 may utilize PCIe connections or other types of connections implemented over one or more networks such as network 106. For example, illustrative embodiments can use interfaces such as Internet SCSI (iSCSI), Serial Attached SCSI (SAS) and Serial ATA (SATA). Numerous other interfaces and associated communication protocols can be used in other embodiments.

As is apparent from the foregoing, terms such as "storage array" and "storage system" as used herein are intended to be broadly construed, and a given such storage array or storage system may encompass, for example, multiple distinct instances of a commercially-available storage array.

The storage devices 110 of the storage arrays 108 are configured to store data utilized by one or more applications running on one or more of the host devices 104. The storage devices 110 on one of the storage arrays 108 are illustratively arranged in one or more storage pools. The storage arrays 108 and their corresponding storage devices 110 are examples of what are more generally referred to herein as "storage systems." A given such storage system in the present embodiment may be shared by the host devices 104, and in such arrangements may be referred to as a "shared storage system."

Processing devices 114 in host devices 104, in some embiodiments, are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices 104 and the storage arrays 108 may be implemented on respective distinct processing platforms, although numerous other arrangements are possible. For example, in some embodiments at least portions of the host devices 104 and the storage arrays 108 are implemented on the same processing platform. The storage arrays 108 can therefore be implemented at least in part within at least one processing platform that implements at least a subset of the host devices 104.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 104 are possible, in which certain ones of the host devices 104 reside in one data center in a first geographic location while other ones of the host devices 104 reside in one or more other data centers in one or more other geographic locations that are potentially remote from the first geographic location. Thus, it is possible in some implementations of the system 100 for different ones of the host devices 104 to reside in different data centers than the storage arrays 108. The storage arrays 108 can be similarly distributed across multiple data centers.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Particular processing operations and other system functionality described herein are presented by way of illustrative example only, and should not be construed as limiting the scope of the disclosure in any way. Alternative embodiments can use other types of processing operations involving host devices, storage systems and access path state change functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements within a given information processing system.

Functionality can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It is to be understood that one or more host devices 104, one or more processing devices 114, one or more memory devices 116, one or more fabric switches of network 106, one or more storage arrays 108, one or more storage devices 110, one or more storage controllers 112, and/or components within any of those components and devices, are considered resources which are deployable by IaaS provider 130 and automatically managed by the infrastructure resource capacity manager 120.

Further, as shown, infrastructure resource capacity manager 120 comprises a resource capacity monitor module 122, an expansion trigger and unit multiplication factor computation module 124, and a resource capacity expansion control module 126. As will be further explained in detail below in the context of other figures, resource capacity monitor module 122 monitors a rate of consumption (usage) of the resources that are part of the IaaS provider deployment. By way of example only, assume that storage devices 110 cumulatively provide the on-premises datacenter 102 with one terabyte (1 TB) of storage over a predetermined time horizon, e.g., one month. Also assume the existence of an agreement between the customer associated with the on-premises datacenter 102 and IaaS provider 130 for the IaaS provider 130 to add additional storage capacity as needed by the customer such that the customer would never run out of storage capacity (i.e., effectively providing unlimited storage capacity). Resource capacity monitor module 122 monitors the rate of usage of the storage capacity currently provided by storage devices 110 of storage arrays 108. Recall that in existing datacenters, an IaaS provider may deploy (install) additional storage devices and/or additional storage arrays to a datacenter after the storage capacity usage exceeds a fixed threshold, e.g., 80% of 1 TB or 800 gigabytes (GB).

However, as explained above, a fixed threshold may not sufficiently accommodate every customer. As such, illustrative embodiments utilize expansion trigger and unit multiplication factor computation module 124 to automatically (and dynamically) determine the expansion trigger threshold, the amount of additional storage devices that should optimally be deployed, and by what date/time the additional storage devices should be deployed to ensure that the customer does not run out of storage capacity. Resource capacity expansion control module 126 manages the deployment of the additional resources within the datacenter 102. Further examples of infrastructure resource capacity management provided by infrastructure resource capacity manager 120 will be described herein.

While infrastructure resource capacity manager 120 is shown in FIG. 1 operatively coupled to but separate from on-premises datacenter 102, it is to be appreciated that all of infrastructure resource capacity manager 120, one or more of resource capacity monitor module 122, expansion trigger and unit multiplication factor computation module 124 and resource capacity expansion control module 126, or parts of one or more of modules 122, 124 and 126 can be implemented on one or more components of on-premises datacenter 102. In the various configurations, it is assumed that one or more of modules 122, 124 and 126 are configured to communicate with one or more host devices 104, one or more processing devices 114, one or more memory devices 116, one or more fabric switches of network 106, one or more storage arrays 108, one or more storage devices 110, one or more storage controllers 112, and/or components within any of those components and devices.

Note that, as shown, infrastructure resource capacity manager 120 can also be coupled to or otherwise integrated with one or more other on-premises datacenters associated with the same customer or multiple customers of IaaS provider 130 in order to provide functionalities described herein.

Figure 2:
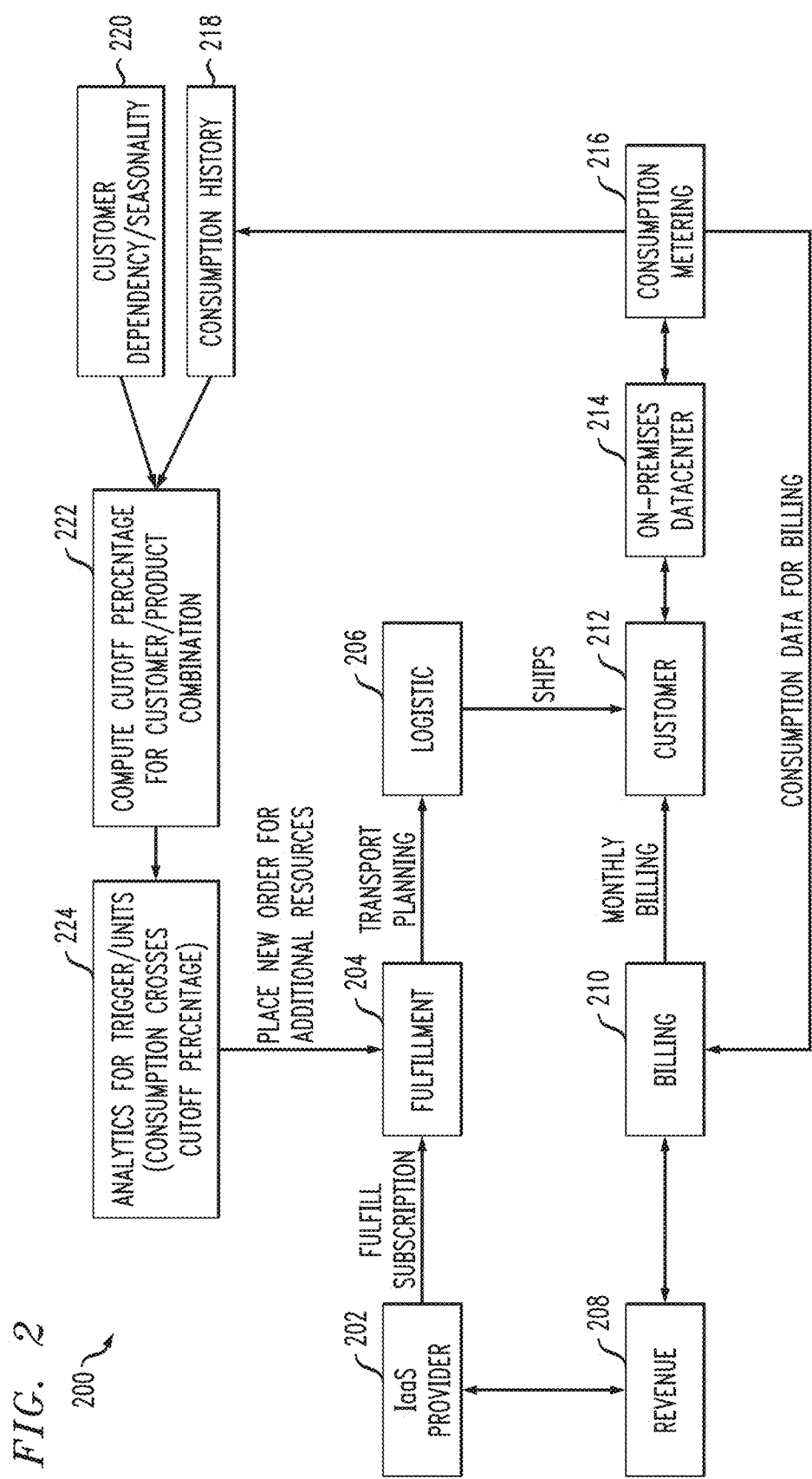
FIG. 2 depicts an infrastructure resource capacity management process according to an illustrative embodiment.

FIG. 2 depicts an infrastructure resource capacity management process 200 according to an illustrative embodiment. In one or more illustrative embodiments, resource capacity management process 200 is automatically and dynamically implemented as part of infrastructure resource capacity manager 120 of FIG. 1.

In one non-limiting example, an IaaS solution available from Dell Technologies Inc is called APEX™. APEX™ is a hardware subscription solution configured to enable customers to subscribe to and obtain infrastructure deployed at their location that is configured to run customer workloads. APEX™ customers can also procure new resources and other as-a-service functionalities. As shown, in response to a customer subscription, IaaS provider 202 (e.g., Dell Technologies Inc.) in fulfillment step 204 fulfills the infrastructure subscription (e.g., manufactures or otherwise obtains the infrastructure resources that are part of the customer subscription such as, but not limited to, host devices 104, network 106 and/or storage arrays 108 of FIG. 1). Transport plans for deployment of the infrastructure resources to the customer site are processed in logistics step 206, and shipped to the customer site 212. The infrastructure resources are then set up for executing customer workloads as on-premises datacenter 214.

Monitoring of consumption usage of the resources (e.g., how much storage capacity of the deployed storage capacity is used) is performed in consumption metering step 216. Note that in infrastructure resource capacity manager 120 of FIG. 1, resource capacity monitor module 122 can provide the monitoring/metering functionalities. The consumption usage information is provided to billing step 210 which computes how much the customer should be charged for the APEX' services. This is the source of revenue 208 for the IaaS provider 202. Resource capacity expansion control module 126 of FIG. 1 can provide management of the deployment of the additional resources within the customer infrastructure.

Additionally, as shown in FIG. 2, the consumption usage information is also provided to a consumption history storage step 218 which stores the historical consumption usage information. Further, dependency and/or seasonality information for the subject customer being monitored is obtained in step 220. The historical consumption usage information and the dependency and/or seasonality information for the subject customer is provided to step 222 wherein a cutoff percentage is computed for the subject customer for a subject product. Once the cutoff percentage is computed, analytics step 224 determines whether consumption usage has crossed the threshold, and triggers an expansion of resource(s) as needed. Note that expansion trigger and unit multiplication factor computation module 124 of FIG. 1 can provide these functionalities. An order is then placed for the additional resources and fulfilled similar to the original infrastructure deployment.

In accordance with resource capacity management process 200, an IaaS provider is able to know the correct expansion trigger threshold, the time to manufacture, and how much to expand the existing on-premises cloud platform based on a rate of usage and user patterns for a specific customer. More particularly, rate of usage is used to determine how the customer is using up a specific product and at what speed, and a usage pattern is derived with respect to holidays and seasonality in the customer pattern. With these above factors, resource capacity management process 200 obtains the usage and the pattern of the usage with all seasonality and customer holiday variations accounted for and determines optimal threshold usage for when to start manufacturing of the resources (learned and re-learned) and how many resources need to be manufactured.

FIGS. 3-8 illustrate various resource consumption scenarios with which illustrative embodiments can be implemented.

Figure 4:
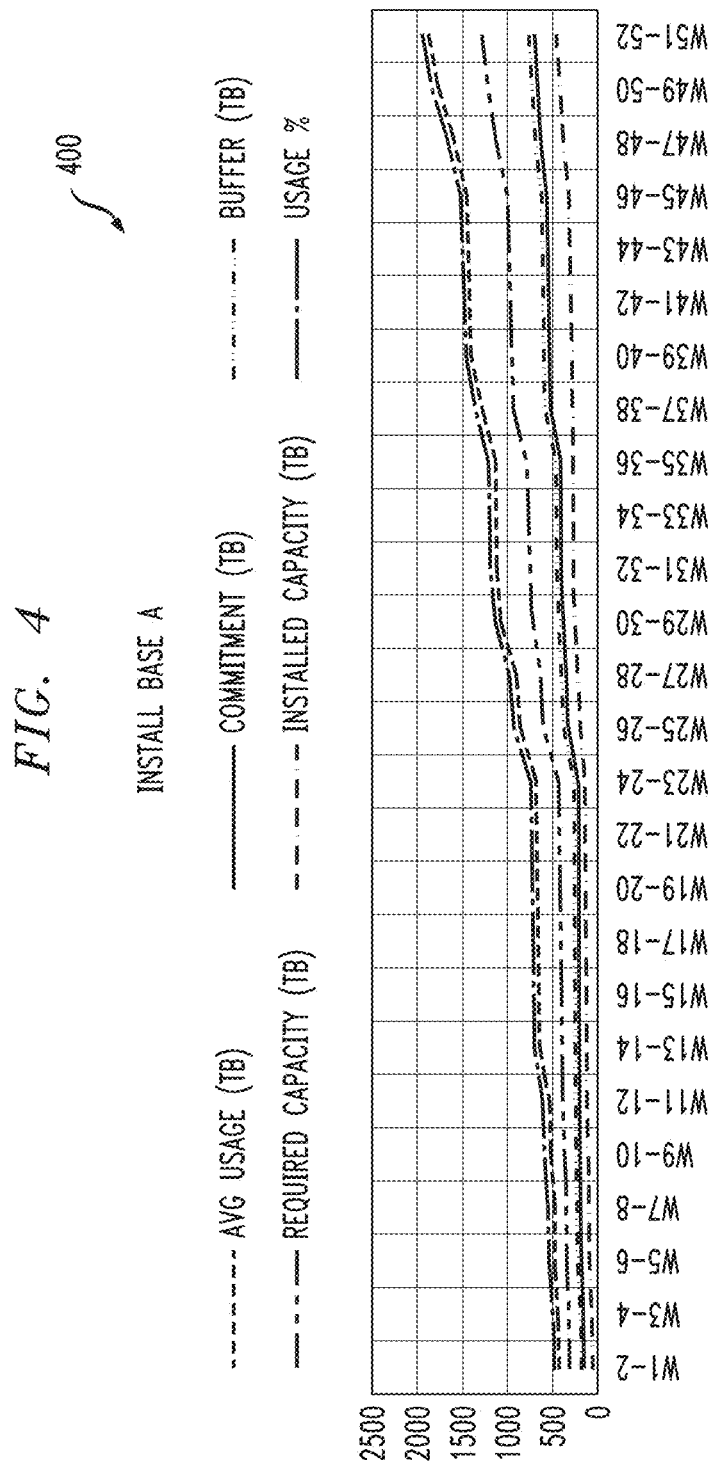
FIG. 4 illustrates a graphical representation of exemplary data with which an infrastructure resource capacity management process can be implemented according to an illustrative embodiment.

A first scenario is represented by the data depicted in FIGS. 3 and 4. More particularly, FIG. 3 shows a tabular representation 300 of exemplary data, while FIG. 4 shows a graphical representation 400 of the exemplary data in tabular representation 300. The first scenario considers one install base (i.e., a given infrastructure configuration deployed in an on-premises datacenter at the customer site) to illustrate how usage consumption is varying over different times of the year and how the growth rate is dynamic. In tabular representation 300, the dark grey shaded cells in the rightmost column represent when the threshold is triggered and the light grey cells in the second column from the left represent when the datacenter will be out of storage. Note that in between week 9 (W9) and week 15 (W15), two triggers are generated and, for the first trigger, deployment needs to be completed within two weeks. Also, note that additional shipping cost would have been avoided if the optimal capacity for deployment could have been predicted. In bi-week W27-28, another trigger is generated on a threshold of 80% usage, but to maintain a satisfactory cloud experience for the customer, deployment needs to be completed in one week.

Figure 6:
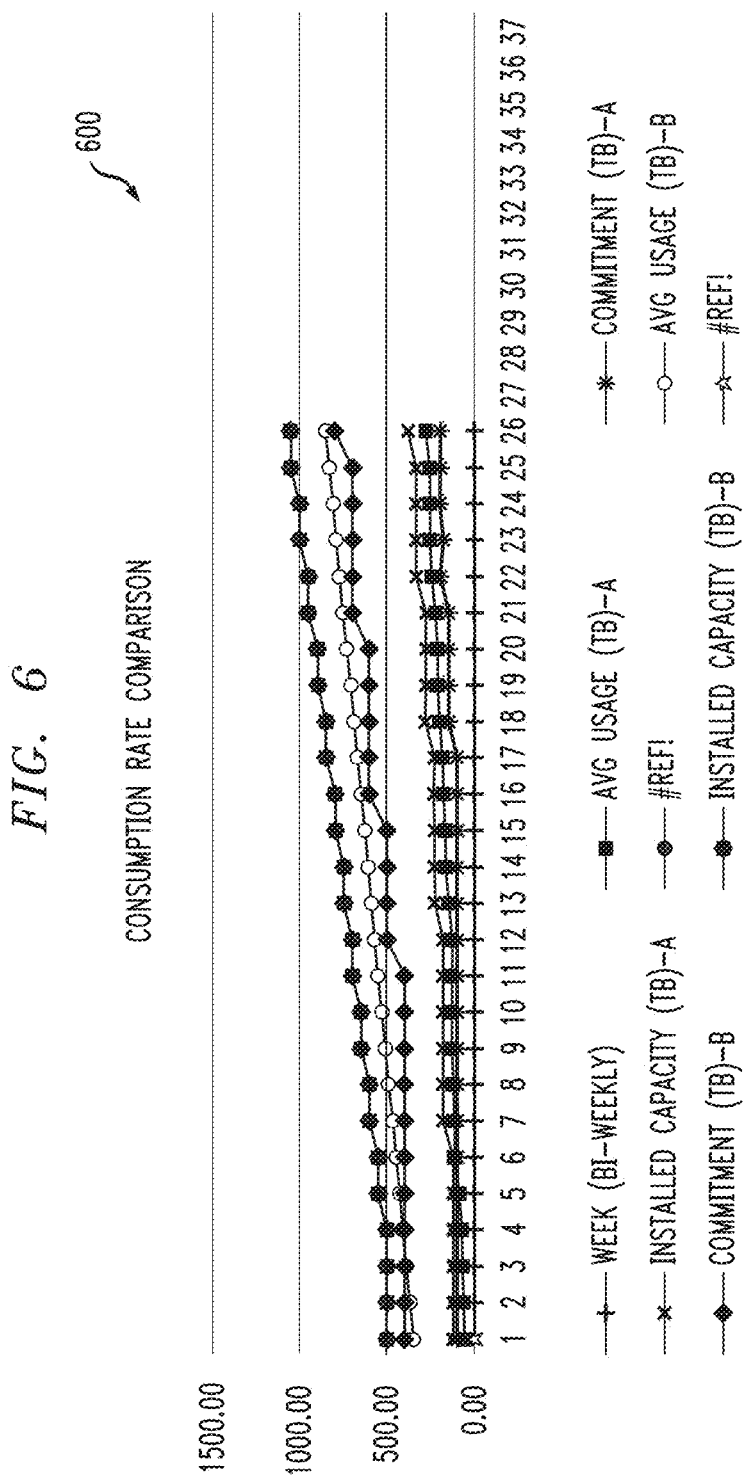
FIG. 6 illustrates a graphical representation of exemplary data with which an infrastructure resource capacity management process can be implemented according to an illustrative embodiment.

A second scenario is represented by the data depicted in FIGS. 5 and 6. More particularly, FIG. 5 shows a tabular representation 500 of exemplary data, while FIG. 6 shows a graphical representation 600 of the exemplary data in tabular representation 500. The second scenario considers two different install bases which each have different growth rates. Thus, using a fixed threshold to trigger shipment and having a fixed number of units for shipping results in excessive deployment and shipping.

Figure 8:
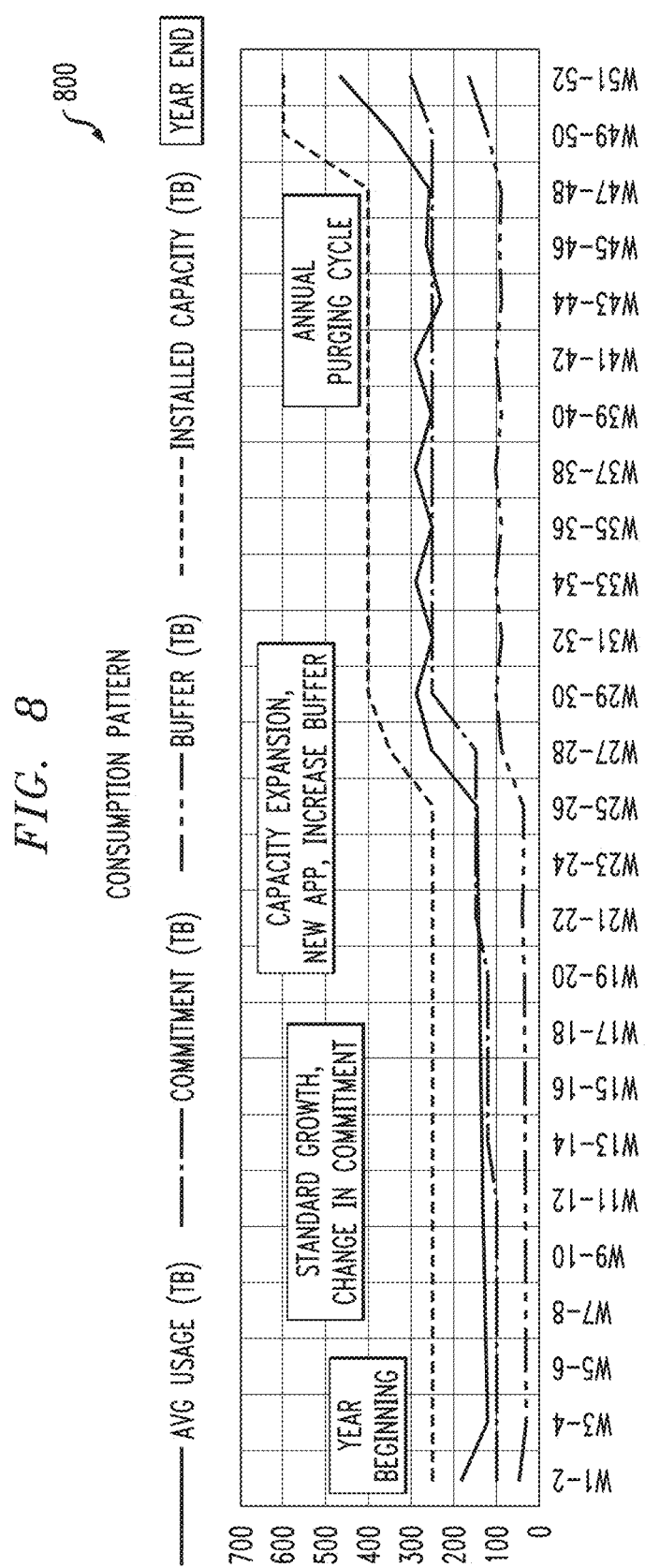
FIG. 8 illustrates a graphical representation of exemplary data with which an infrastructure resource capacity management process can be implemented according to an illustrative embodiment.

A third scenario is represented by the data depicted in FIGS. 7 and 8. More particularly, FIG. 7 shows a tabular representation 700 of exemplary data, while FIG. 8 shows a graphical representation 800 of the exemplary data in tabular representation 700. The third scenario considers the benefit (which is not available in existing systems) of being able to predict the consumption rate ahead of the estimated runout time and also to predict the capacity require for next predetermined number of days/month. Based on the exemplary data, it is realized herein that an increase in storage consumption varies due to multiple factors such as seasonality (e.g., year-end activity, new year sales, etc.), application usage, a purging cycle, etc. All these are, in general, influencing factors on the consumption rate, and will vary from one customer to another customer and from one install base to another install base. In this third scenario, it is evident that using a static threshold (e.g., 80%) will result in many occasions where the application will run out of storage before additional storage is shipped and deployed.

As mentioned above and as illustrated in the above scenarios, there is no existing system or approach to intelligently derive a threshold usage for each individual customer for an expansion order to be triggered. Existing approaches use a static threshold (e.g., 80% of usage consumption) to start manufacturing and shipping. This results in many problems including, but not limited to:
 (i) Delayed shipments. For those customers whose rate of consumption is high, the shipment may get delayed, e.g., the remaining 20% storage capacity will be used before the IaaS provider ships and provisions additional hardware.
 (ii) Frequent shipments. For those customers whose rate of consumption is very high, the standard one unit shipment will cause frequent shipments, causing higher costs.
 (iii) Early shipment of additional hardware. For those customers whose rate of consumption is low, they will get this additional hardware earlier. This will cause an issue of storing the additional hardware at the customer location, leading to additional cost.
 (iv) Shipment can be at the wrong time for customer. The IaaS provider should not be deploying new hardware at busy transaction times or important events of the customer.

Resource capacity management process 200 (FIG. 2) automatically and dynamically implemented as part of infrastructure resource capacity manager 120 (FIG. 1) overcomes the above and other limitations of existing approaches by utilizing factors that affect the steps of threshold setting and deriving the number of units to be shipped. Customers with a high consumption rate will have a lesser threshold value. If the customer has buying experience with the IaaS provider and their rack space is empty, more units can be shipped and kept in the customer space, so that multiple shipments can be avoided. With the current history of consumption, the process flows utilize supervised learning using a Bayesian network with dependency on, inter alia, customer holidays, deployment windows, as well as using linear regression, as will be further explained below.

Infrastructure resource capacity manager 120 inputs data indicating how a specific customer is using a specific product and at what speed (i.e., rate of usage) and derives a usage pattern based on holidays, seasons and the customer pattern to provide a custom expansion plan for that specific customer. The custom expansion plan indicates when to start manufacturing (based on trigger threshold) and how many resource units need to be manufactured and delivered unit multiplication factor). By using machine learning techniques of classification and prediction, infrastructure resource capacity manager 120 is configured to generate an optimal expansion plan customized for each customer.

Figure 9:
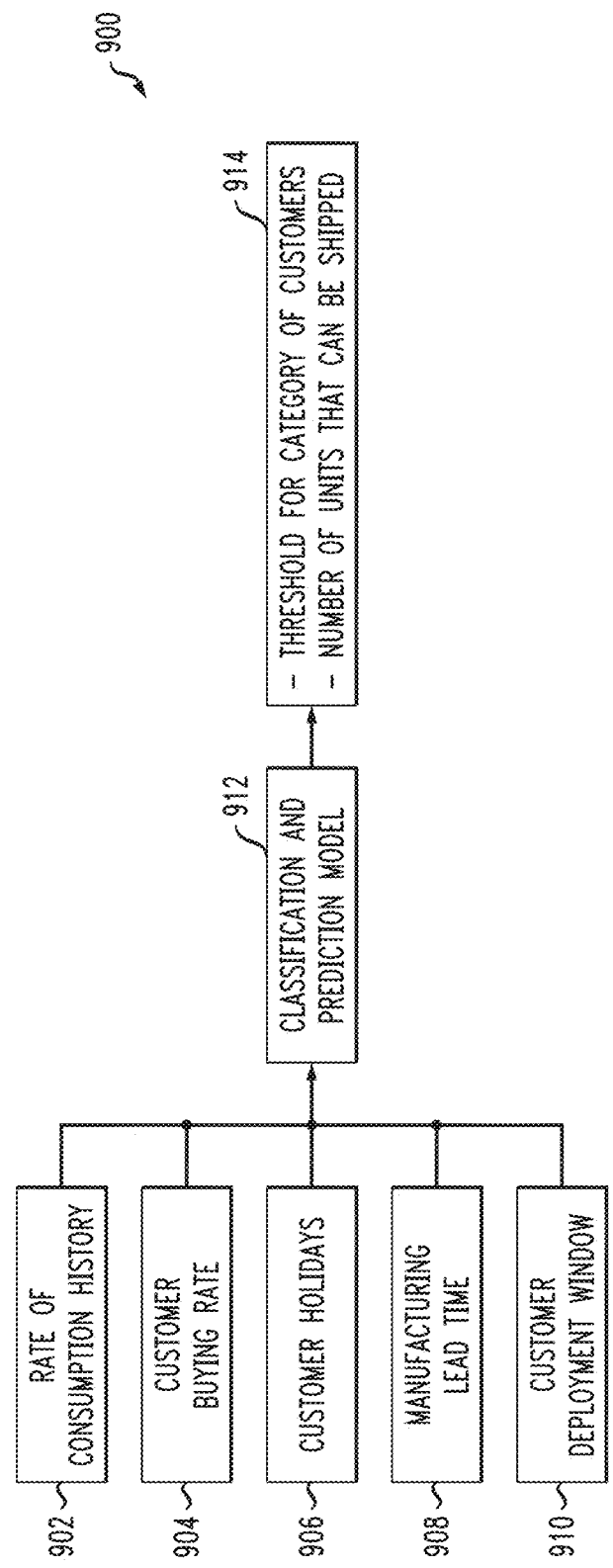
FIG. 9 illustrates computation of an expansion trigger cutoff threshold and a unit multiplication factor using machine learning according to an illustrative embodiment.

FIG. 9 illustrates a process 900 for computation of an expansion trigger threshold and a unit multiplication factor using machine learning according to an illustrative embodiment. In one or more illustrative embodiments, infrastructure resource capacity manager 120 of FIG. 1 is configured to execute process 900. As shown in FIG. 9, input data including, but not limited to, historical rate of consumption data 902, customer buying rate data 904, customer holidays data 906, manufacturing lead time data 908 and customer deployment window data 910 are applied to a classification and prediction model 912 to generate output data 914 which includes, but is not limited to, an expansion trigger threshold for a category of one or more customers, as well as the number of units to ship (unit multiplication factor). Those of ordinary skill in the art will appreciated the functions of a classification an prediction model and, as such, any further conventional details are not provided herein.

Figure 10:
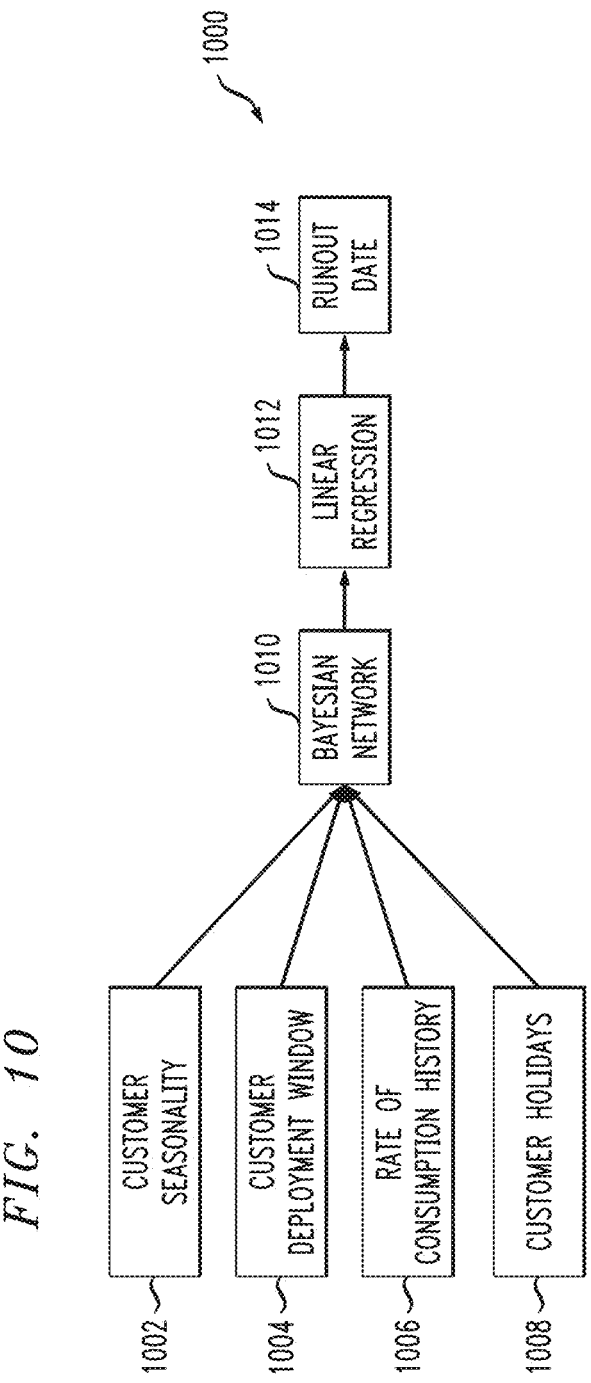
FIG. 10 illustrates computation of a resource runout date according to an illustrative embodiment.

FIG. 10 illustrates a process 1000 for computation of a resource runout date according to an illustrative embodiment. In one or more illustrative embodiments, infrastructure resource capacity manager 120 of FIG. 1 is configured to execute process 1000. As shown in FIG. 10, input data including, but not limited to, seasonality data 1002, customer deployment window data 1004, historical rate of consumption data 1006 and customer holidays data 1008 are applied to a Bayesian network 1010 whose output is applied to a linear regression module 1012 to generate output data 1014 which includes, but is not limited to, a runout date. Process 1000 is an example of a supervised learning algorithm. Those of ordinary skill in the art will appreciated the functions of a Bayesian network and linear regression module and, as such, any further conventional details are not provided herein.

Other machine learning or artificial intelligence algorithms, both supervised and unsupervised, can be used in processes 900 and 1000 in alternative embodiments.

Figure 11:
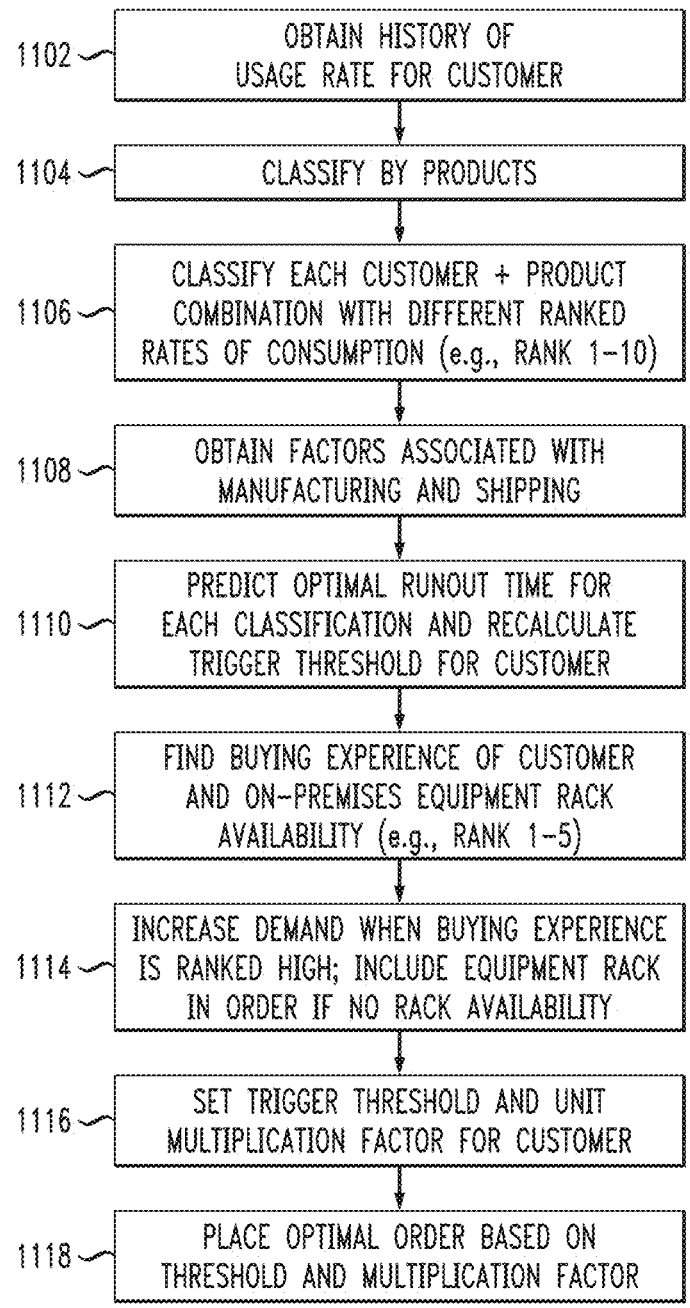
FIG. 11 illustrates a process flow for infrastructure resource capacity management based on computing a runout date, an expansion trigger threshold and a unit multiplication factor according to an illustrative embodiment.

FIG. 11 illustrates a process flow 1100 for infrastructure resource capacity management based on computing a runout date, an expansion trigger threshold and a unit multiplication factor according to an illustrative embodiment. In one or more illustrative embodiments, infrastructure resource capacity manager 120 of FIG. 1 is configured to execute process 1100.

More particularly, as shown, step 1102 obtains historical usage rate data for a specific customer. Step 1104 classifies the data based on products deployed in an on-premises datacenter of the specific customer. Step 1106 classifies each customer-product combination with different ranked rates of consumption, e.g., usage ranks 1-10 where 1 is highest and 10 is lowest.

In step 1108, process 1100 obtains data indicative of factors associated with manufacturing and shipping (e.g., as mentioned herein, lead time, customer deployment windows, etc.). Based on these and other factors mentioned above in the context of FIGS. 9 and 10, step 1110 predicts the optimal runout time for each classification and recalculates (or initially calculates) the expansion trigger threshold for the specific customer.

In step 1112, process 1100 determines a buying experience associated with the specific customer as well as rack availability (e.g., PowerStore™ or PowerScale™ rack that is configured to accommodate additional storage devices after initial installation) and generates a buying experience rank, e.g., buying experience ranks 1-5 where 1 is highest buying experience 5 is lowest buying experience. Note that, as illustratively used herein, buying or buyer experience refers to the historical purchasing frequency or rate for the specific customer (e.g., how often and/or how many resources/products/services has the customer purchased from the IaaS provider). Thus, the higher the rank, the more frequent is the customer purchasing history. An exemplary algorithm for computing a buying rank (or buyer rate) is described below in the context of FIG. 12. Step 1114 increases demand (e.g., the unit multiplication factor or the number of units) when the buying experience is high. Also, when there is no rack availability, a new rack to accommodate additional resources is included in the order. The amount of added resources is determined by the unit multiplication factor. The expansion trigger threshold and unit multiplication factor are set in step 1116 for the specific customer and product. The optimal order is placed based on these factors in step 1118.

Figure 12:
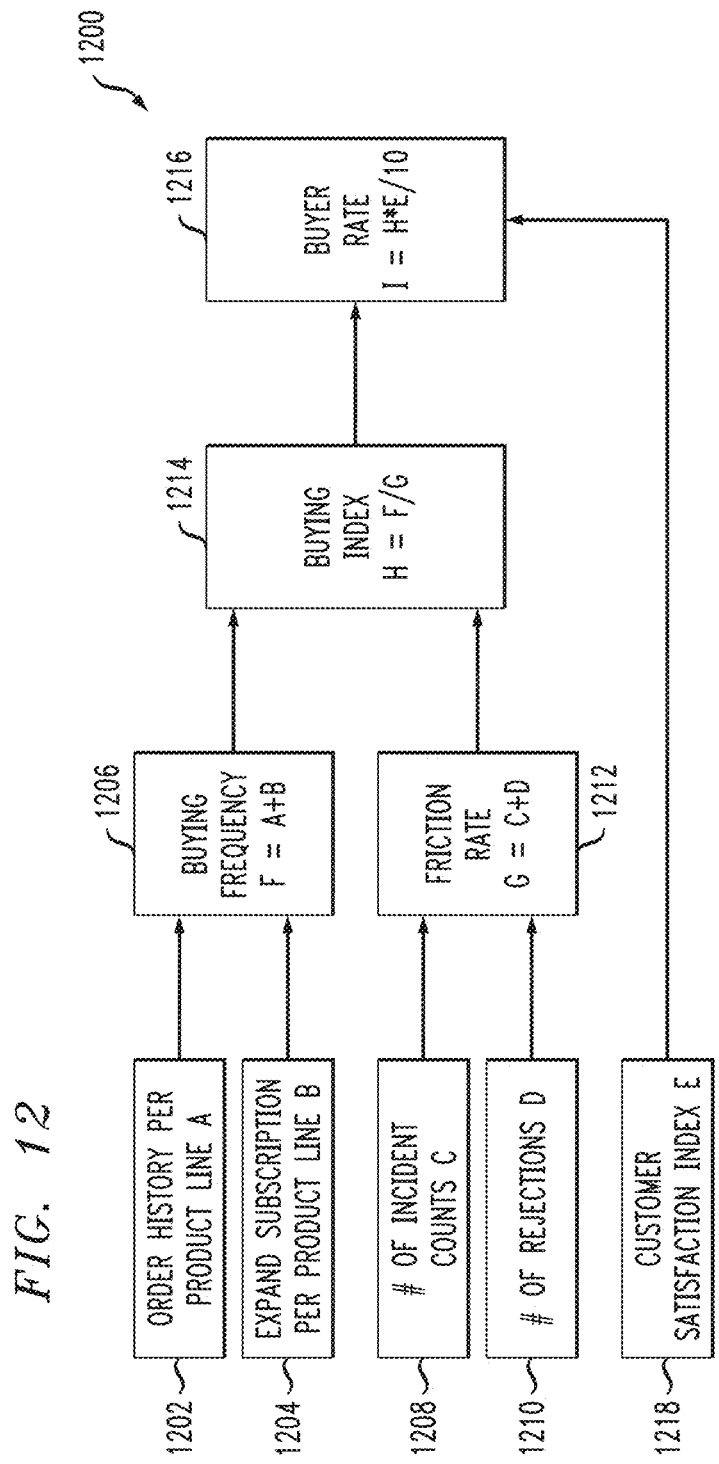
FIG. 12 illustrates a process flow for computing a buyer rating parameter according to an illustrative embodiment.

FIG. 12 illustrates a process flow 1200 for computing a buyer rating parameter according to an illustrative embodiment. As shown, rank values A and B respectively associated with an order history per product line 1202 (e.g., 10) and an expand subscription per product line 1204 (e.g., 8) are added in step 1206 to generate a buying frequency value F (e.g., 18). Further, count values C and D respectively associated with a number of incidents associated with the customer 1208 (e.g., 6) and a number of rejections associated with the customer 1210 (e.g., 2) are added in step 1212 to generate a friction rate value G (e.g., 8). A buying index value H is computed in step 1214 by dividing the buying frequency value F by the friction rate G (e.g., 18/8=2.25). Lastly, in step 1216, a buyer rate I is computed by dividing a customer satisfaction index value 1218 (e.g., E=8) by 10 and multiplying the quotient by the buying index value H (e.g., 2.25*8/10=1.8).

FIGS. 13A-13C illustrate exemplary data associated with multiple customers using infrastructure resource capacity management according to an illustrative embodiment. Tables 1310 (FIG. 13A), 1320 (FIG. 13B) and 1330 (FIG. 13C) show exemplary data for two different customers, i.e., Customer 1 and Customer 2, each with two different install bases, i.e., a PowerScale™ storage system and a PowerStore™ storage system, that are part of, or otherwise constitute, their IaaS on-premises datacenter. Note that these storage systems are only examples of resources that are manageable in accordance with illustrative embodiments. From the exemplary data, assume the following computations based on systems and processes described herein in accordance with illustrative embodiments:

Manufacturing Lead Time+Delivery Lead time of PowerStore™: 32 days;
Manufacturing Lead time+Delivery Lead time of PowerScale™: 42 days;
Threshold Percentage for the combinations:

$$((\text{Predicted Order Placing Date}-\text{SystDate})*\text{Predicted Consumption Rate/Current Balance Capacity}))*80/100, \text{ where 80 is the percentile.}$$

From the exemplary data and computations, it is evident that the trigger threshold percentage for each customer and product (install base) is different when the rate of consumption and balance capacity is considered:

Expansion trigger threshold for Customer 1/Install Base 1 is set as 72%;
Expansion trigger threshold for Customer 1/Install Base 2 is set as 68%;
Expansion trigger threshold for Customer 2/Install Base 1 is set as 87%; and
Expansion trigger threshold for Customer 2/Install Base 2 is set as 82%.

Advantageously, by dynamically computing and setting the threshold to different percentages for different customers and different products, illustrative embodiments avoid the drawbacks described herein and that otherwise exist when utilizing a static threshold setting across all customers and install bases.

Figure 14:
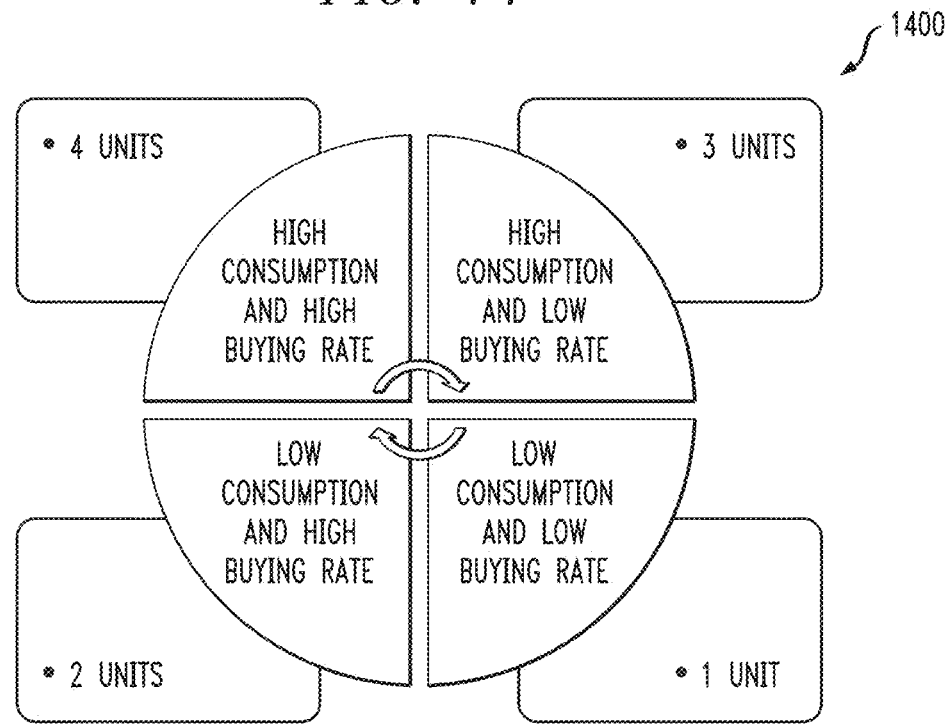
FIG. 14 illustrates an example resource expansion scenario according to an illustrative embodiment.

FIG. 14 illustrates an example resource expansion scenario 1400 according to an illustrative embodiment. Assuming the exemplary data and computations described above in the context of tables 1310, 1320 and 1330, the IaaS provider ships four units in one shipment to Customer 1, and only two units in one shipment to Customer 2. This reduces the multiple shipment for Customer 1 where it is likely they will purchase all four units. Additionally, instead of sending one unit, Customer 2 is sent two units (rather than four) as their rate of consumption is low and the extra units beyond two will be unused and thus unnecessary at that customer location.

Accordingly, illustrative embodiments provide systems and methods for deriving the optimal threshold usage cutover (cutoff) for each customer to enable subscribed private cloud providers to manufacture and ship to customer locations, based on the rate of consumption, consumption pattern, customer data center plans, and customer usage behavior with seasonality variations. Further, illustrative embodiments provide systems and methods for deriving the optimal number of additional devices to be shipped to the customer location, based on usage rate of consumption and consumption pattern.

Figure 15:
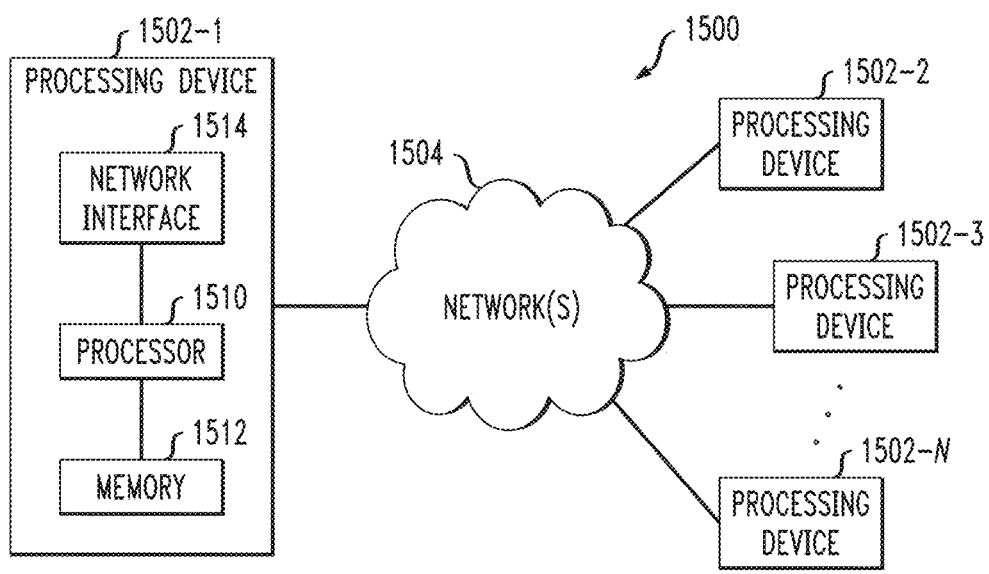
FIG. 15 illustrates an example of a processing platform that may be utilized to implement at least a portion of an information processing system for infrastructure resource capacity management functionalities according to an illustrative embodiment.

FIG. 15 depicts a processing platform 1500 used to implement infrastructure resource capacity management according to an illustrative embodiment. More particularly, processing platform 1500 is a processing platform on which a computing environment with functionalities described herein (e.g., FIGS. 1-14 and otherwise described herein) can be implemented.

The processing platform 1500 in this embodiment comprises a plurality of processing devices, denoted 1502-1, 1502-2, 1502-3, . . . 1502-N, which communicate with one another over network(s) 1504. It is to be appreciated that the methodologies described herein may be executed in one such processing device 1502, or executed in a distributed manner across two or more such processing devices 1502. It is to be further appreciated that a server, a client device, a computing device or any other processing platform element may be viewed as an example of what is more generally referred to herein as a "processing device." As illustrated in FIG. 15, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 1502 shown in FIG. 15. The network(s) 1504 represent one or more communications networks that enable components to communicate and to transfer data therebetween, as well as to perform other functionalities described herein.

The processing device 1502-1 in the processing platform 1500 comprises a processor 1510 coupled to a memory 1512. The processor 1510 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1510. Memory 1512 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1512 may comprise electronic memory such as random-access memory (RAM), read-only memory (ROM) or other types of memory, in any combination. The one or more software programs when executed by a processing device such as the processing device 1502-1 causes the device to perform functions associated with one or more of the components/steps of system/methodologies in FIGS. 1-14. One skilled in the art would be readily able to implement such software given the teachings provided herein. Other examples of processor-readable storage media embodying embodiments of the invention may include, for example, optical or magnetic disks.

Processing device 1502-1 also includes network interface circuitry 1514, which is used to interface the device with the networks 1504 and other system components. Such circuitry may comprise conventional transceivers of a type well known in the art. The other processing devices 1502 (1502-2, 1502-3, . . . 1502-N) of the processing platform 1500 are assumed to be configured in a manner similar to that shown for computing device 1502-1 in the figure.

The processing platform 1500 shown in FIG. 15 may comprise additional known components such as batch processing systems, parallel processing systems, physical machines, virtual machines, virtual switches, storage volumes, etc. Again, the particular processing platform shown in this figure is presented by way of example only, and the system shown as 1500 in FIG. 15 may include additional or alternative processing platforms, as well as numerous distinct processing platforms in any combination.

Also, numerous other arrangements of servers, clients, computers, storage devices or other components are possible in processing platform 1500. Such components can communicate with other elements of the processing platform 1500 over any type of network, such as a wide area network (WAN), a local area network (LAN), a satellite network, a telephone or cable network, or various portions or combinations of these and other types of networks.

Furthermore, it is to be appreciated that the processing platform 1500 of FIG. 15 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1500 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-15 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus comprising:
at least one processing device comprising a processor coupled to a memory, the at least one processing device, when executing program code, is configured to:
obtain data associated with at least one resource of one or more computing platforms, wherein each of the one or more computing platforms is deployed at one or more locations associated with one or more entities;
compute one or more resource expansion trigger threshold values based on at least a portion of the obtained data for each of the one or more computing platforms; and
initiate a resource expansion operation for the one or more computing platforms based on the one or more resource expansion trigger threshold values;
wherein the at least one processing device, when executing program code, is further configured to:
compute one or more unit multiplication factor values based on at least a portion of the obtained data for each of the one or more computing platforms;
determine an amount of additional resources to deploy to the one or more locations associated with one or more entities based on the one or more unit multiplication factor values; and
initiate the resource expansion operation for the one or more computing platforms additionally based on the one or more unit multiplication factor values; and
wherein the one or more unit multiplication factor values are each determined based on: (i) an availability of equipment rack capacity to accommodate a given number of a given resource based on historical resource acquisition data associated with the corresponding one of the one or more entities; and (ii) a resource acquisition ranking of the corresponding one of the one or more entities based on the historical resource acquisition data.

2. The apparatus of claim 1, wherein the at least one processing device, when executing program code, is further configured to:
compute one or more unit runout time values based on at least a portion of the obtained data for each of the one or more computing platforms; and
initiate the resource expansion operation for the one or more computing platforms additionally based on the one or more unit runout time values.

3. The apparatus of claim 2, wherein one or more of the one or more resource expansion trigger threshold values, the one or more unit multiplication factor values, and the one or more unit runout time values are computed using a machine learning algorithm.

4. The apparatus of claim 3, wherein one or more inputs to the machine learning algorithm comprise at least a portion of the obtained data.

5. The apparatus of claim 4, wherein the obtained data comprises one or more of: historical rate of resource consumption data, entity buying data, entity seasonality data, entity holiday data, entity location availability data, and resource manufacturing data.

6. The apparatus of claim 5, wherein the entity buying data for a given one of the one or more entities is derived based on a buyer rate computed from one or more of an entity buying frequency value, an entity friction rate value, an entity satisfaction value.

7. The apparatus of claim 1, wherein the one or more entities comprise one or more customers of an infrastructure provider that provides the one or more computing platforms.

8. The apparatus of claim 1, wherein the at least one resource comprises one of a computing resource, a networking resource and a storage resource of a given one of the one or more computing platforms.

9. The apparatus of claim 1, wherein computing one or more resource expansion trigger threshold values based on at least a portion of the obtained data for each of the one or more computing platforms further comprises computing a resource expansion trigger threshold value unique to each of the one or more entities such that the resource expansion operation is customized to each of the one or more entities.

10. A method comprising:
obtaining data associated with at least one resource of one or more computing platforms, wherein each of the one or more computing platforms is deployed at one or more locations associated with one or more entities;
computing one or more resource expansion trigger threshold values based on at least a portion of the obtained data for each of the one or more computing platforms; and
initiating a resource expansion operation for the one or more computing platforms based on the one or more resource expansion trigger threshold values;
wherein the method further comprises:
computing one or more unit multiplication factor values based on at least a portion of the obtained data for each of the one or more computing platforms; and determining an amount of additional resources to deploy to the one or more locations associated with one or more entities based on the one or more unit multiplication factor values; and
initiating the resource expansion operation for the one or more computing platforms additionally based on the one or more unit multiplication factor values; and
wherein the one or more unit multiplication factor values are each determined based on: (i) an availability of equipment rack capacity to accommodate a given number of a given resource based on historical resource acquisition data associated with the corresponding one of the one or more entities; and (ii) a resource acquisition ranking of the corresponding one of the one or more entities based on the historical resource acquisition data.

11. The method of claim 10, further comprising:
computing one or more unit runout time values based on at least a portion of the obtained data for each of the one or more computing platforms; and
initiating the resource expansion operation for the one or more computing platforms additionally based on the one or more unit runout time values.

12. The method of claim 11, wherein one or more of the one or more resource expansion trigger threshold values, the one or more unit multiplication factor values, and the one or more unit runout time values are computed using a machine learning algorithm.

13. The method of claim 12, wherein one or more inputs to the machine learning algorithm comprise at least a portion of the obtained data.

14. The method of claim 13, wherein the obtained data comprises one or more of: historical rate of resource consumption data, entity buying data, entity seasonality data, entity holiday data, entity location availability data, and resource manufacturing data.

15. The method of claim 14, wherein the entity buying data for a given one of the one or more entities is derived based on a buyer rate computed from one or more of an entity buying frequency value, an entity friction rate value, an entity satisfaction value.

16. The method of claim 10, wherein computing one or more resource expansion trigger threshold values based on at least a portion of the obtained data for each of the one or more computing platforms further comprises computing a resource expansion trigger threshold value unique to each of the one or more entities such that the resource expansion operation is customized to each of the one or more entities.

17. A computer program product comprising a non-transitory processor-readable storage medium having stored therein program code of one or more software programs, wherein the program code when executed by at least one processing device cause the at least one processing device to:
obtain data associated with at least one resource of one or more computing platforms, wherein each of the one or more computing platforms is deployed at one or more locations associated with one or more entities;
compute one or more resource expansion trigger threshold values based on at least a portion of the obtained data for each of the one or more computing platforms; and initiate a resource expansion operation for the one or more computing platforms based on the one or more resource expansion trigger threshold values;

wherein the program code when executed by the at least one processing device further cause the at least one processing device to:

compute one or more unit multiplication factor values based on at least a portion of the obtained data for each of the one or more computing platforms;

determine an amount of additional resources to deploy to the one or more locations associated with one or more entities based on the one or more unit multiplication factor values; and initiate the resource expansion operation for the one or more computing platforms additionally based on the one or more unit multiplication factor values; and wherein the one or more unit multiplication factor values are each determined based on: (i) an availability of equipment rack capacity to accommodate a given number of a given resource based on historical resource acquisition data associated with the corresponding one of the one or more entities; and (ii) a resource acquisition ranking of the corresponding one of the one or more entities based on the historical resource acquisition data.

18. The computer program product of claim 17, wherein computing one or more resource expansion trigger threshold values based on at least a portion of the obtained data for each of the one or more computing platforms further comprises computing a resource expansion trigger threshold value unique to each of the one or more entities such that the resource expansion operation is customized to each of the one or more entities.

19. The computer program product of claim 17, wherein the program code when executed by the at least one processing device further cause the at least one processing device to:

compute one or more unit runout time values based on at least a portion of the obtained data for each of the one or more computing platforms; and initiate the resource expansion operation for the one or more computing platforms additionally based on the one or more unit runout time values.

20. The computer program product of claim 19, wherein one or more of the one or more resource expansion trigger threshold values, the one or more unit multiplication factor values, and the one or more unit runout time values are computed using a machine learning algorithm.

\* \* \* \* \*